UNITED STATES PATENT OFFICE 2,585,864

PRINTING PLATE ETCHING

Karl Sollner, Chevy Chase, Md., assignor to Harris-Seybold Company, Cleveland, Ohio, a corporation of Ohio No Drawing. Application October 7, 1949, Serial No. 120,229

10 Claims. (Cl. 41—42)

In the making of metal printing plates, it is common practice to coat the plate with a colloidal light-sensitive solution which after drying, is exposed to light for the desired matter to be reproduced, and is developed to remove unexposed coating; and thereafter the metal of the plate is etched away to desired depth in the areas which are unprotected by the exposed, hardened coating or "resist" as it is sometimes called.

The foregoing general procedure is common to the preparation of various kinds of printing plates. It is usual, however, to employ different coating materials and different etching materials, depending upon the kind of metal of which the plate is made and upon the results desired. For example, relief printing plates of zinc are commonly made up by applying a cold top enamel of shellac base and are ecthed with nitric acid; relief plates of copper are coated with cold top enamel and are etched with an iron chloride, hydrochloric acid or nitric acid; zinc lithographic plates of the "deep etch" type are usually coated with a gum arabic base coating and are etched with a solution of calcium chloride and hydrochloric acid or magnesium chloride and formic acid; aluminum "deep etch" lithographic plates utilize a similar coating and may be etched with a mixture of magnesium chloride, iron chloride and formic acid; "bi-metal" lithographic plates, for instance, comprising a thin layer of chromium over copper, are usually made up by coating with a cold top enamel or with a gum arabic base material and are etched by a strong solution of calcium chloride, zinc chloride and hydrochloric acid; copper intaglio or gravure plates are commonly coated with a gelatin "resist" and are etched with iron chloride containing some hydrochloric acid, several solutions of progressively increasing concentration being used in the etching process.

In all such instances there is a tendency for the coating to be attacked by the etching fluid to an extent harmful to the finished plate. In order to guard against such action, it is necessary to use the etching fluid at sufficiently low acid concentration. This, in turn, results in an undesirably slow rate of etching. Furthermore, in some instances, as where etching chromium or chromium-bearing alloys, very strong etching fluids are required and highly noxious fumes are given off. And in such chromium or nickel surfaced plates it has been particularly difficult to successfully apply a known etching procedure without detriment to the "resist." Inasmuch as such plates are very durable, once properly made, the lack of satisfactory etching means to obviate the difficulties heretofore characteristic has been a serious limitation against their more general use. In the present invention, etching materials and procedure may be had which particularly facilitate preparation of printing plates. Etching fluids of lower acid concentration may be successfully used, thus substantially eliminating discomfort and danger to the operator, and permitting the use of resist materials which have been heretofore impractical with the etching fluids required. Furthermore, increased speeds of etching are attained, with attendant advantages.

Other objects and advantages of the invention will appear from the following description.

To the accomplishment of the foregoing and related ends, the invention then comprises the features hereinafter fully described, the following description setting forth in detail certain illustrative embodiments of the invention, these being indicative, however, of but a few of the various ways in which the principle of the invention may be employed.

The present invention is applicable to printing plates of quite a variety as above noted, and with various metals or combinations of metals such as are used for printing plates, and notable advantages are had with stainless steel alloying metals, i. e. chromium, nickel, and their combinations, such as stainless steel; and the plate may be of single metal type or of bi-metallic structure involving for instance, a chromium or a nickel layer or plating on a copper or zinc or steel or other metal layer, or a plurality of such basic metals. The etching solution may involve a suitable etching agent, for instance a halide, such as an alkaline earth halide, e. g., calcium chloride, and preferably magnesium chloride, or zinc chloride, etc. The etching solution may be made up as usual, by dissolving a halide in water to a desired strength and acidifying to suitable working pH as customary in known etches, using a suitable acid such as will not cause precipitation of alkaline earth halide or breakdown of the resist, as for example formic, hydroxyacetic, sulfamic, hydrochloric or hydrobromic acid. Etching solutions such as set forth in W. H. Wood Patent No. 2,270,712 may be used. A satisfactory concentration in general is 34–36 Bé. This may in some cases vary slightly more or less. With the etching solution I provide a catalyst. This involves the platinum group and may be introduced in the form of a platinum compound or compound of other metal of the platinum group, both light and heavy metals of this group, viz. platinum, palladium, iridium, osmium, rhodium and ruthenium, the first three being the most important. Chloroplatinic acid is a desirable form. Platinum chloride may be employed, and in some instances colloidal platinum. Correspondingly, as regards the palladium and other said metals, analogous compounds may be used.

The compound or colloidal metal thus employed is introduced into the etching solution in catalytic amount. Concentrations of 1–100 parts per million figured as metal are adequate. In general, the higher the concentration, the more rapid the action. Concentrations of one part per million or less are undesirably slow in operation. The printing plates exposed and developed and ready for this stage of operation are then subjected to the solution and etched along the lines of usual practice. The operation proceeds smoothly and uniformly and with desired speed. Moreover, etches may be used which are so mild as to be ineffective if used on chromium or nickel unless this catalyst is introduced. Thus resists not usable with strongly acid etches or with etches of the customary high concentration of salts become possible. Also, workers are not exposed to irritating fumes as in the case of etching chromium in prior practice. While the ordinary plates such as zinc, aluminum, etc., can be employed with the present etch, the advantages are particularly notable with the resistant surfaces of the chromium category.

As an illustrative example:

$MgCl_2$ solution (5 molal) in water, 3.785 liters.
Hydroxyacetic acid, 45 G.
Sulfamic acid, 135 G.
HCl (37%), 120 cc.
Chloroplatinic acid, 85 parts Pt per million calculated as the metal.

As another example:

To a saturated solution of $MgCl_2$, two per cent each of formic and glycollic acids are added, and 85 parts per million of palladium as palladium chloride.

The mechanism of operation of this etching bath is not definitely known. One possible theory is that there is involved as a first stage, the precipitation of the catalyst metal in metallic form in finely dispersed state on the surface of the plate to be etched. A multitude of galvanic couples is thereby set up in which the plate metal is the less noble, dissolving-electrode, and the catalyst metal is the positive electrode at which hydrogen can be evolved under proper conditions. At any rate, irrespective of possible theories, the action of the etching bath proceeds rapidly and uniformly.

In some instances, the platinum or the like can be less desirably introduced by incorporation in small proportion in the surface of the plate to be etched. Or in some instances a foil or sheet or other convenient form of the metal or the platinum can be provided, or it may be a deposit on porcelain or carbon as carrier, and in any case connected to the lithographic plate by contact or wire as a couple. Such metallic couple is immersed in an etching bath of proper composition. Such an arrangement is feasible more particularly where very large plates are to be etched and a tank equipment suitable therefor is available. With this particular procedure, since there is no additional use of a catalyst added as such to the etching solution, the used solution can be discarded without loss of the catalyst. The action in this form of set-up appears to be that the electrolytic couple involved in the platinum and chromium causes the chromium to be dissolved in those areas where it is not protected by the previously carried out developing treatment, etc.

In any case, the etching is performed in the presence of the catalyst. As indicated, however, directly dissolving the catalyst in the etching solution is generally more advantageous and desirable.

Other modes of applying the principle of the invention may be employed, change being made as regards the details described, provided the features stated in any of the following claims, or the equivalent of such, be employed.

I therefore particularly point out and distinctly claim as my invention:

1. In preparing a metal printing plate of the group consisting of chromium, chromium alloys and nickel, incorporating in a magnesium chloride etching solution a catalytic amount of chlorplatinic acid, and etching the plate in such solution.

2. In preparing a metal printing plate of the group consisting of chromium, chromium alloys and nickel, providing in a magnesium chloride etching solution available platinum, and etching the plate in such solution.

3. In preparing a metal printing plate of the group consisting of chromium, chromium alloys and nickel, providing in a magnesium chloride etching solution a catalyst of the platinum group, and etching the plate in such solution.

4. In preparing a metal printing plate of the group consisting of chromium, chromium alloys and nickel, providing in a magnesium chloride etching solution a platinum group catalyst, and etching a chromium-surfaced plate in such solution.

5. In preparing a metal printing plate of the group consisting of chromium, chromium alloys and nickel, incorporating in an etching solution a catalytic amount of chlorplatinic acid, and etching the plate in such solution.

6. In preparing a metal printing plate of the group consisting of chromium, chromium alloys and nickel, providing in an etching solution a platinum catalyst, and etching the plate in such solution.

7. In preparing a metal printing plate of the group consisting of chromium, chromium alloys and nickel, providing in an etching solution a catalyst of the platinum group, and etching the plate in such solution.

8. In preparing a metal printing plate of the group consisting of chromium, chromium alloys and nickel, etching the plate in an etching solution in the presence of an available agent of the platinum group.

9. In a process of the character described, etching a metal printing plate which has a stainless steel alloying metal in its surface by subjecting such plate to an etching liquid in the presence of platinum.

10. In a process of the character described, etching a metal printing plate which has a stainless steel alloying metal in its surface by subjecting such plate to an etching liquid in the presence of a metal of the platinum group.

KARL SOLLNER.

REFERENCES CITED

The following references are of record in the file of this patent:

UNITED STATES PATENTS

| Number | Name | Date |
|---|---|---|
| 1,994,499 | Boller | Mar. 19, 1935 |
| 2,207,868 | Martin | July 16, 1940 |
| 2,270,712 | Wood | Jan. 20, 1942 |

FOREIGN PATENTS

| Number | Country | Date |
|---|---|---|
| 354,500 | Great Britain | Aug. 13, 1931 |